(12) United States Patent
Shaw et al.

(10) Patent No.: US 11,995,296 B2
(45) Date of Patent: *May 28, 2024

(54) SYSTEM AND METHOD FOR CREATING A SINGLE-ENTITY PROTOCOL-COMPLIANT UNIFORM RESOURCE LOCATOR

(71) Applicant: Hexagon Technology Center GmbH, Heerbrugg (CH)

(72) Inventors: Scott David Shaw, Stockley (GB); Jack Llewellyn Cockerell, Kemble (GB)

(73) Assignee: Hexagon Technology Center GmbH, Heerbrugg (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/096,815

(22) Filed: Jan. 13, 2023

(65) Prior Publication Data

US 2023/0289041 A1 Sep. 14, 2023

Related U.S. Application Data

(63) Continuation-in-part of application No. 17/691,877, filed on Mar. 10, 2022, now Pat. No. 11,570,230.

(51) Int. Cl.
| | | |
|---|---|---|
| H04L 29/08 | (2006.01) | |
| G06F 3/0482 | (2013.01) | |
| G06F 3/0484 | (2022.01) | |
| G06F 9/451 | (2018.01) | |
| G06F 9/54 | (2006.01) | |
| H04L 29/06 | (2006.01) | |

(52) U.S. Cl.
CPC .......... *G06F 3/0484* (2013.01); *G06F 3/0482* (2013.01); *G06F 9/451* (2018.02); *G06F 9/547* (2013.01)

(58) Field of Classification Search
CPC ...... G06F 3/0484; G06F 9/451; G06F 3/0482; G06F 9/547; H04L 29/08; H04L 29/06
USPC .......................................................... 709/206
See application file for complete search history.

(56) References Cited

U.S. PATENT DOCUMENTS

| | | | |
|---|---|---|---|
| 7,519,688 B2 * | 4/2009 | Behrens | H04L 67/02 709/227 |
| 8,429,189 B1 * | 4/2013 | Spielberg | G06F 16/245 709/230 |
| 11,570,230 B1 * | 1/2023 | Shaw | H04L 67/561 |

(Continued)

OTHER PUBLICATIONS

Author Unknown—Oasis Committee Note "What's New in Odata," Version 4.01, dated Sep. 26, 2019, 488 pages.

(Continued)

*Primary Examiner* — Jude Jean Gilles
(74) *Attorney, Agent, or Firm* — Nutter McClennen & Fish LLP

(57) ABSTRACT

A graphical user interface is configured to guide a user through a method of creating an OData-compliant URL, without requiring that the user be familiar with syntax of OData-compliant URLs. The graphical user interface includes a set of graphical input devices to solicit and receive from the user input specifying a set of query options, which user input is used to define the OData-compliant URL. The graphical user interface is automatically customized to solicit and receive from the user input only for options available from a specific OData service.

20 Claims, 8 Drawing Sheets

(56) References Cited

U.S. PATENT DOCUMENTS

| | | | |
|---|---|---|---|
| 2006/0155529 A1* | 7/2006 | Ludviksson | G06F 40/154 |
| | | | 704/4 |
| 2010/0235469 A1* | 9/2010 | Morris | H04L 67/563 |
| | | | 709/219 |
| 2014/0250377 A1 | 9/2014 | Bisca et al. | |
| 2014/0372956 A1 | 12/2014 | Bisca et al. | |
| 2015/0294377 A1* | 10/2015 | Chow | G06Q 30/0263 |
| | | | 705/347 |
| 2016/0253708 A1* | 9/2016 | Mody | G06Q 30/0269 |
| | | | 705/14.66 |
| 2017/0012920 A1 | 1/2017 | Chheda et al. | |
| 2017/0021356 A1 | 1/2017 | Dority et al. | |
| 2017/0094017 A1 | 3/2017 | Jakobs | |
| 2017/0155736 A1 | 6/2017 | Schukovets et al. | |
| 2017/0364346 A1 | 12/2017 | Peng et al. | |
| 2018/0107525 A1 | 4/2018 | Govindaraju et al. | |
| 2018/0217818 A1* | 8/2018 | Douglas | H04L 67/02 |
| 2019/0028360 A1* | 1/2019 | Douglas | H04L 41/22 |
| 2020/0293680 A1 | 9/2020 | Navarro-Dimm et al. | |

OTHER PUBLICATIONS

Author Unknown—PragmatiQa XOData: "Overview with an Example," doc version 1.3, 12 pages, undated.

\* cited by examiner

SYSTEM AND METHOD FOR CREATING A SINGLE-ENTITY PROTOCOL-COMPLIANT UNIFORM RESOURCE LOCATOR

RELATED APPLICATIONS

This application is a Continuation-In-Part of U.S. application Ser. No. 17/691,877, filed Mar. 10, 2022 and titled "System and Method for Creating a Protocol-Compliant Uniform Resource Locator" and naming Scott David Shaw and Jack Llewellyn Cockerell as inventors.

The disclosure of each of the foregoing is incorporated herein by reference, in its entirety.

TECHNICAL FIELD

Embodiments generally relate to requesting data from a remote data source, more particularly, embodiments relate to requesting data from a remote data source having an application program interface.

BACKGROUND ART

Some computer networks allow a requesting computer (or client computer) to request, and retrieve, data from a remote server computer. An example familiar to Internet users is clicking on a link in a web browser, or entering a uniform resource locator ("URL") into a web browser. Each of those actions causes the client to send a request for content across the Internet to the server, and in response the server sends its content across the Internet to the client. In that familiar scenario, the response from, the server includes whatever the server stores at that moment it receives the request from the client, although the server may also add other content. For example, a server hosting a news site would send whatever news stories were posted on the site at the moment the server received the request, and may include advertising content in additions to the news stories. Either way, the client's request is open ended, and simply causes the server to send whatever the server has or wants to send. In other words, standard URLs do not allow the client to tailor the information it requests and receives from the server.

SUMMARY OF VARIOUS EMBODIMENTS

Illustrative embodiments consist of a new user interface, bespoke controls and components to facilitate a user (or client) in creating a tailored uniform resource locator to request from a remote data service 120 (e.g., a server), which data service 120 has an upfront mechanism to describe the data service 120 (e.g., data structure and how the data is segmented or searchable), without technical knowledge or understanding of the syntax, format, or other specific requirements of such a request.

For example, such a user interface could be implemented for a data service 120 operating in compliance with OpenAPI, which is a RESTful specification referred-to as the OpenAPI Specification (or "OAS"), and available from https://www.openapis.org/. OpenAPI provides servers (e.g., users of OpenAPI) first with the ability to expose their web API via an 'OpenAPI document/Swagger Document' which can then be consumed (e.g., retrieved from the server and processed) by a client in the process of creating a request for specific data (e.g., a subset of the data that can be requested from and supplied to the client by the server).

The interface dynamically exposes each step combining information from the user's security profile, the API and the control with which the URL will be used.

In accordance with one embodiment, a method of creating a uniform resource locator that complies with a RESTful API protocol (a "protocol-compliant" URL) at a computer remote from a data service includes:

obtaining, from a metadata source, metadata describing source data available from the data service;

customizing a graphical user interface ("GUI") by populating a set of graphical input devices within the GUI with information specified by the metadata, such that the GUI is configured to solicit and receive user input specifying a set of query options to request, from the data service, data available from the data service, wherein the set of graphical input devices within the GUI includes:

a first graphical input device configured to receive, from a user, first user input specifying a category of the source data available from the data service, the category including a subset of said source data, the subset being less than all of the source data; and a second graphical input device configured to receive, from the user, second user input specifying a single object of source data from the category;

receiving first user input via the first graphical input device and second user input via the second graphical input device of the graphical user interface; and generating the protocol-compliant uniform resource locator by application of a set of rules to the first user input and the second user input, said protocol-compliant URL configured to solicit from the data service the single object of source data.

In some embodiments, said protocol-compliant URL is configured to solicit from the data service only the single object of source data. In other embodiments, the set of graphical input devices within the GUI further includes a third graphical input device configured to receive, from a user, specification of a navigation property, the navigation property defining a relationship between the single object and a set of other objects at the data source, such that the single object and each object in the set of other objects is related to one another; and the protocol-compliant URL is configured to solicit from the data service the single object of source data along with a set of objects related to the single object of source data.

In some embodiments, the second graphical input device is configured to accept second user input including a user specification of a single object of source data from a limited and pre-specified set including a plurality of items of source data.

In some embodiments, each category of the source data available from the data service has an associated pre-specified set including a plurality of items of source data, and: the second graphical input device includes a drop-down menu configured to present to the user a listing of the pre-specified set of the plurality of items of source data, and wherein: the pre-specified set of the plurality of items of source data is selected based on a prior specification, by the user, of first user input specifying a category of the source data available from the data service.

In some embodiments, the metadata source is the data service.

In some embodiments, application of a rule from the set of rules includes applying a rule that formats the user input into a format defined by the RESTful API protocol. In some embodiments, application of a rule from the set of rules includes adding, to the user input, a prefix defined by the RESTful API protocol.

In some embodiments, generating the protocol-compliant uniform resource locator by application of a set of rules to the user input includes, for at least one item of user input: appending a prefix to said user input and adding the prefix and user input to the protocol-compliant uniform resource locator.

Another embodiment includes a system for creating a uniform resource locator that complies with a RESTful API protocol (a "protocol-compliant" URL) for enabling a client to request specified data held at a remote data service as source data, the system including:

a graphical user interface driver configured to customize a graphical user interface ("GUI") by populating a set of graphical input devices within the GUI with information specified by the metadata, such that the GUI is configured to solicit and receive user input specifying a set of query options to request, from the data service, data available from the data service, wherein the set of graphical input devices within the GUI includes:

a first graphical input device configured to receive, from a user, first user input specifying a category of the source data available from the data service, the category including a subset of said source data, the subset being less than all of the source data; and a second graphical input device configured to receive, from the user, second user input specifying a single object of source data from the category;

a GUI data receiver configured to receive, via the graphical user interface, first user input via the first graphical input device and second user input via the second graphical input device of the graphical user interface; and a protocol-compliant URL generator configured to apply a set of rules to the first user input and the second user input to produce, from said user input, the protocol-compliant URL, said protocol-compliant URL configured to solicit from the data service the single object of source data.

In some such embodiments, the second graphical input device is configured to accept second user input including a user specification of a single object of source data from a limited and pre-specified set including a plurality of items of source data.

In some embodiments, each category of the source data available from the data service has an associated pre-specified set including a plurality of items of source data, and: the second graphical input device includes a drop-down menu configured to present to the user a listing of the pre-specified set of the plurality of items of source data, and wherein the metadata source is the data service. In some embodiments, the pre-specified set of the plurality of items of source data is selected based on a prior specification, by the user, of first user input specifying a category of the source data available from the data service.

In some embodiments, the metadata source is the data service.

In some embodiments, application of a rule from the set of rules includes applying a rule that formats the user input into a format defined by the RESTful API protocol.

In some embodiments, application of a rule from the set of rules includes adding, to the user input, a prefix defined by the RESTful API protocol.

In some embodiments, generating the protocol-compliant uniform resource locator by application of a set of rules to the user input includes, for at least one item of user input: appending a prefix to said user input and adding the prefix and user input to the protocol-compliant uniform resource locator.

In some embodiments, said protocol-compliant URL is configured to solicit from the data service only the single object of source data.

In some embodiments, the set of graphical input devices within the GUI further includes a third graphical input device configured to receive, from a user, specification of a navigation property, the navigation property defining a relationship between the single object and a set of other objects at the data source, such that the single object and each object in the set of other objects is related to one another; and the protocol-compliant URL is configured to solicit from the data service the single object of source data along with a set of objects related to the single object of source data.

Yet another embodiment includes a non-transitory computer-readable medium having computer code thereon, the computer code configured to be executed by a computer, the computer code including:

code for causing the computer to obtain, from a metadata source, metadata describing source data available from the data service;

code for causing the computer to present a graphical user interface ("GUI") by populating a set of graphical input devices within the GUI with information specified by the metadata, such that the GUI is configured to solicit and receive user input specifying a set of query options to request, from the data service, data available from the data service, wherein the set of graphical input devices within the GUI includes:

a first graphical input device configured to receive, from a user, first user input specifying a category of the source data available from the data service, the category including a subset of said source data, the subset being less than all of the source data; and a second graphical input device configured to receive, from the user, second user input specifying a single object of source data from the category;

code for causing the computer to receive first user input via the first graphical input device and second user input via the second graphical input device of the graphical user interface; and code for causing the computer to generate the protocol-compliant uniform resource locator by application of a set of rules to the first user input and the second user input, said protocol-compliant URL configured to solicit from the data service the single object of source data.

In some such embodiments, the second graphical input device is configured to accept second user input including a user specification of a single object of source data from a limited and pre-specified set including a plurality of items of source data.

In some embodiments, each category of the source data available from the data service has an associated pre-specified set including a plurality of items of source data, and: the second graphical input device includes a drop-down menu configured to present to the user a listing of the pre-specified set of the plurality of items of source data, and wherein: the pre-specified set of the plurality of items of source data is selected based on a prior specification, by the user, of first user input specifying a category of the source data available from the data service.

In some embodiments, the metadata source is the data service.

In some embodiments, application of a rule from the set of rules includes applying a rule that formats the user input into a format defined by the RESTful API protocol.

In some embodiments,
application of a rule from the set of rules includes at least one of:
adding, to the user input, a prefix defined by the RESTful API protocol; and
appending a prefix to said user input and adding the prefix and user input to the protocol-compliant uniform resource locator.

In some embodiments, said protocol-compliant URL is configured to solicit from the data service only the single object of source data.

In some embodiments, the set of graphical input devices within the GUI further includes a third graphical input device configured to receive, from a user, specification of a navigation property, the navigation property defining a relationship between the single object and a set of other objects at the data source, such that the single object and each object in the set of other objects is related to one another; and wherein: the protocol-compliant URL is configured to solicit from the data service the single object of source data along with a set of objects related to the single object of source data.

BRIEF DESCRIPTION OF THE DRAWINGS

Those skilled in the art should more fully appreciate advantages of various embodiments from the following "Description of Illustrative Embodiments," discussed with reference to the drawings summarized immediately below.

DESCRIPTION OF ILLUSTRATIVE EMBODIMENTS

Figure 1A:
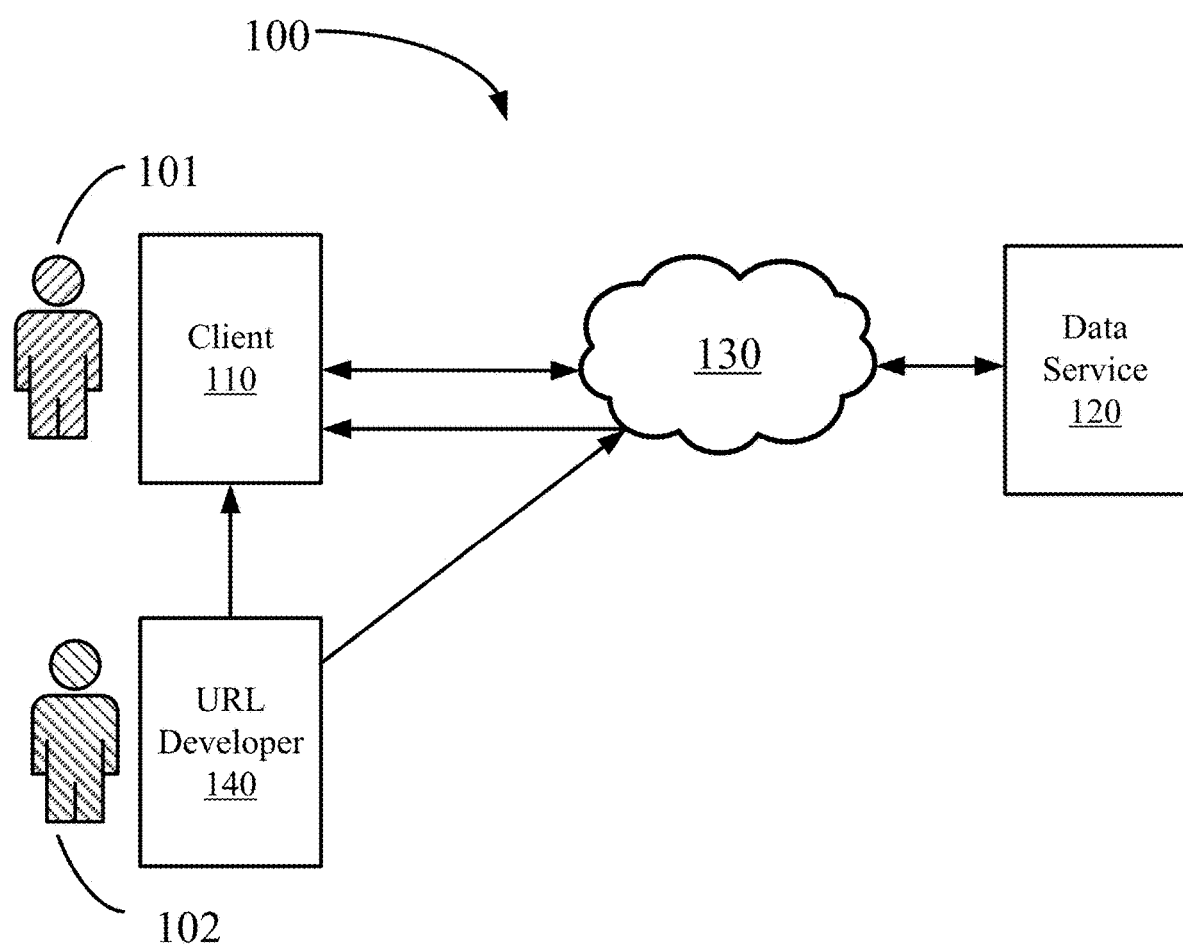
FIG. 1A schematically illustrates a system environment according to illustrative embodiments.

Illustrative embodiments address issues arising in creation of a protocol-compliant URL for use within a system of networked computers. Indeed, the issues arise from the field of computers communicating with one another over a network.

Specifically, illustrative embodiments make creating protocol-compliant URLs (such as an OData-compliant URLs and OpenAPI-compliant URLs) available to non-technical users without requiring such users to learn the complex syntax and other details of the standard.

Taking OData as an example, creating an OData-compliant URL historically required the creator to understand the intricacies of the OData specification, such as its specific terminology, and its complex syntax. The OData 4.01 standard is incorporated herein, in its entirety, by reference. The OData 4.01 standard is available, as of this writing, at http://docs.oasis-open.org/odata/odata/v4.01/ and also at https://www.odata.org/documentation/.

Moreover, in order to create an OData-compliant URL for use with a OData service (e.g., a remote server storing data, and configured to receive and respond to an OData-compliant query), the creator would be required to query the OData service to determine what data is available, and what parameters may be searched using the OData-compliant URL. Executing such a query, and interpreting the result, required the creator to possess additional understanding of the OData specification.

Consequently, the complexity of the OData specification, and of OData-compliant URLs, and the process of creating OData-compliant URLs, made the creation of OData-compliant URLs impossible for anyone without a deep knowledge of the OData specification.

In contrast, illustrative embodiments automate portions of the process of creating a protocol-compliant URL, and enable a user to create a protocol-compliant URL, all without requiring the user to have a detailed understanding of the associated standard. For example, illustrative embodiments automatically create a customized user interface, which user interface is customized based on source data available from a data service, and functions that said data service is capable of performing, and by applying a set of rules to user input to create from said user input a protocol-compliant URL.

Definitions: As used in this description and the accompanying claims, the following terms shall have the meanings indicated, unless the context otherwise requires.

A "data service" (or "datasource") is a computer (e.g., a server) that stores source data, and that is configured to comply with a specification (or protocol) for an API that enables the computer to understand and provide responsive data in response to receipt, at the computer from a remote client, of a protocol-compliant URL. In typical embodiments, the computer is also configured to respond to receipt, at the computer from a remote client, of a request for a metadata document associated with and descriptive of data stored on the computer.

The term "graphical user interface" (or "GUI") means a form of computer-user interface that allows users to interact with a computer at least in part through graphical devices displayed on a computer display screen. Examples of graphical devices may include a graphical icon, a menu (including a drop-down menu), a window, and a pane, to name but a few examples. A data entry area (e.g., a rectangle) that is associated with another graphical device and that is configured to receive alpha-numeric input from a user (e.g., where the alpha-numeric input is solicited by such other graphical device) is also an example of a graphical device. A command-line, and a text editor, without more, is not a graphical user interface.

The term "responsive data" means source data produced by a data service in response receipt from a client of a protocol-compliant URL.

A "metadata document" is a document that includes metadata that describes the source data available at a data service. Metadata in a metadata document identifies one or more of columns (or "categories" or "entities") of source data; relationships among columns of source data; number of records of source data, or number of records in each column of source data, type of source data (e.g., text; number; date), the format of source data (e.g., Microsoft Word; spreadsheet; flat file; .pdf; .jpg; .mpg, etc.), available properties on which the data service can filter the source data, to name but a few examples.

For example, an "OData Metadata Document," pursuant to the Open Data Protocol, describes entities, relationship entity sets, actions, and functions. Generally speaking, a metadata document associated with an OData service describes at least one of the types, sets, functions (or "data retrieval functions") and actions understood by the OData service. Clients can use the metadata document to understand how to query and interact with entities in the data service. A client may retrieve the "OData Metadata Document" associated with an OData service, for example by sending from the client to the OData service a "$metadata" call (or "request"), as defined by the Open Data Protocol, which returns to the client from the OData Metadata Document associated with that OData service. For example, in illustrative embodiments, a $metadata request from a client to an OData service causes the OData service to send to the client an EDMX document (an XML file that defines an Entity Data Model ("EDM")] that contains a complete description of the feeds, types, properties, functions (data retrieval functions), and relationships exposed by that OData service.

The term "OData" refers to the Open Data, which is an open protocol that allows the creation and consumption of queryable and interoperable representational state transfer ("REST") application programming interface (API) (together, "REST APIs") in a standard way. OData is approved by the International Organization for Standardization (ISO) and the International Electrotechnical Commission (IEC), and is an Organization for the Advancement of Structured Information Standards standard that defines a set of best practices for building and consuming representational REST APIs. The Open Data Protocol is specified by a standard generally referred-to as "OData." For example, OData 4.0 was published by the International Organization for Standardization as "ISO/IEC 20802." As of Sep. 26, 2019, the current OData standard was OData Version 4.01. The inventors anticipate that the Open Data Protocol will continue to evolve. The concepts and embodiments disclosed herein are not limited to OData, and are OData embodiments are not limited to a specific version of the Open Data Protocol.

A "protocol-compliant URL" is a URL that complies with a specification (or protocol) for an API that, in general, allows the creation and consumption of queryable and interoperable REST APIs in a standard way (e.g., allows both humans and computers to discover and understand the capabilities of a data service) without requiring access to source code, additional documentation, or inspection of network traffic. Such specifications include the Open Data Protocol ("OData") specification and the OpenAPI specification, to name but a few examples. A URL that merely complies with the hypertext transfer protocol ("http") is not a protocol-compliant URL.

An object at a data service is "related to" another object at the data service, in some embodiments, because the object and the another object at the data service have been classified, at the data service 120, as being related to one another. In some embodiments, an object at a data service is "related to" another object at the data service because the object and such another object share a tag in common with one another.

In some embodiments, an object at a data service is "related to" another object at the data service because the object and such another object share some common subject matter. For example, if the object is a payroll record of a specific employee, then other payroll records of that specific employee are related objects to that object.

A "set" includes at least one member. Unless otherwise specified, a set may include as few as a single member, or may include a plurality of members. For example, unless otherwise specified: a set of parameters may include a single parameter or a plurality of parameters; a set of rules may include a single rule or a plurality of rules; a set of records may include a single record or a plurality of records, etc.

The term "source data," with regard to data stored by a data service, means data from which the data service may compose responsive data. Each item of source data typically is classified into one of a plurality of categories, where each category may be referred-to as an "entity" or as a "column" of source data. The source data in a first column may have a relationship with source data in a second column, and the source data (or a subset of source data) may be specified or selected by specifying one or more parameters of such a relationship. For example, if the first column contains purchase order numbers, and the second column contains customer indicia (e.g., customer name, customer number, etc.), source data may be selected by specifying just purchase orders (in which case the selected data will include all purchases orders in the source data), or by specifying both purchase orders and a customer name (in which case the selected data will include only purchase orders associated with that customer name). In OData, relationships from one entity to another are represented as navigation properties.

FIG. 1A schematically illustrates an environment in which a RESTful API protocol-compliant URL may be used. Illustrative embodiments are described with an OData-compliant URL, but embodiments are not limited to OData compliance.

In FIG. 1A, a data service 120 (e.g., an OData service; an OpenAPI service) holds data, and is configured to receive (from a requestor such as requestor 101 using client 110) a query from a client 110 wishing to retrieve data from the data service 120. The query is in the form of a protocol-compliant URL. For example, where the data service 120 is an OData service, the data service 120 is configured to receive a query in the form of an OData-compliant URL, and to respond to that query by sending to the requestor 101 all or a subset of the data held by OData service 120.

A requestor 101 at client 110 may desire to retrieve a copy of some or all of the data held by the OData service 120. To that end, the requestor 101 submits a query to OData service 120 via an OData-complaint URL, and the OData service 120 respond by sending, to the client 110, the requested data.

The content of the OData-complaint URL specifies the data requested by the requestor 101, and may also specify other parameters of the response, such as the organization of the requested data in the response.

Such a query, and its associated response, may be transmitted via a network 130. In illustrative embodiments, the network 130 may be a local area network ("LAN"), a wide area network ("WAN"), or the Internet, or any combination of LAN, WAN and the Internet, to name but a few examples.

Note that an OData-complaint URL, and the response to use of an OData-complaint URL, are different from a conventional uniform resource locator used in the Internet and/or the World Wide Web. For example, such a conventional uniform resource locator is a request from a client to a server for the server to send to the client the data held by the server. For example, a URL that specifies the home page of a news website causes the server of the news website to send to the client the content of the home page of the news website as that content exists at the moment the server of the news website receives the request. Such a URL may be thought of as a "dumb" URL in that the receiving server decides what data to send to the requester. Such a dumb URL does not allow the user at the client to tailor a request to specify, to the data source, that the responsive data produced by the data source must include only a subset of the data at the data source.

In contrast, an OData-compliant URL may specify one or more parameters (or "system query options" or "query options") that define (for example, and without limiting all embodiments) the content and order of the responsive data from an OData services 120. System query options in OData include $filter, $select, $orderby, $count, $top, $skip and $expand.

An OData-compliant URL may be created by the requestor 101, or by another creator 102 using URL Developer 140 and supplied to the client 110 (for use by requestor 101) directly, or via the network 130. URL Developer 140 may be part of the client 110, or may be a separate system, for example a separate system implemented on a computer distinct from the computer on which the client 110 is implemented.

Figure 1B:
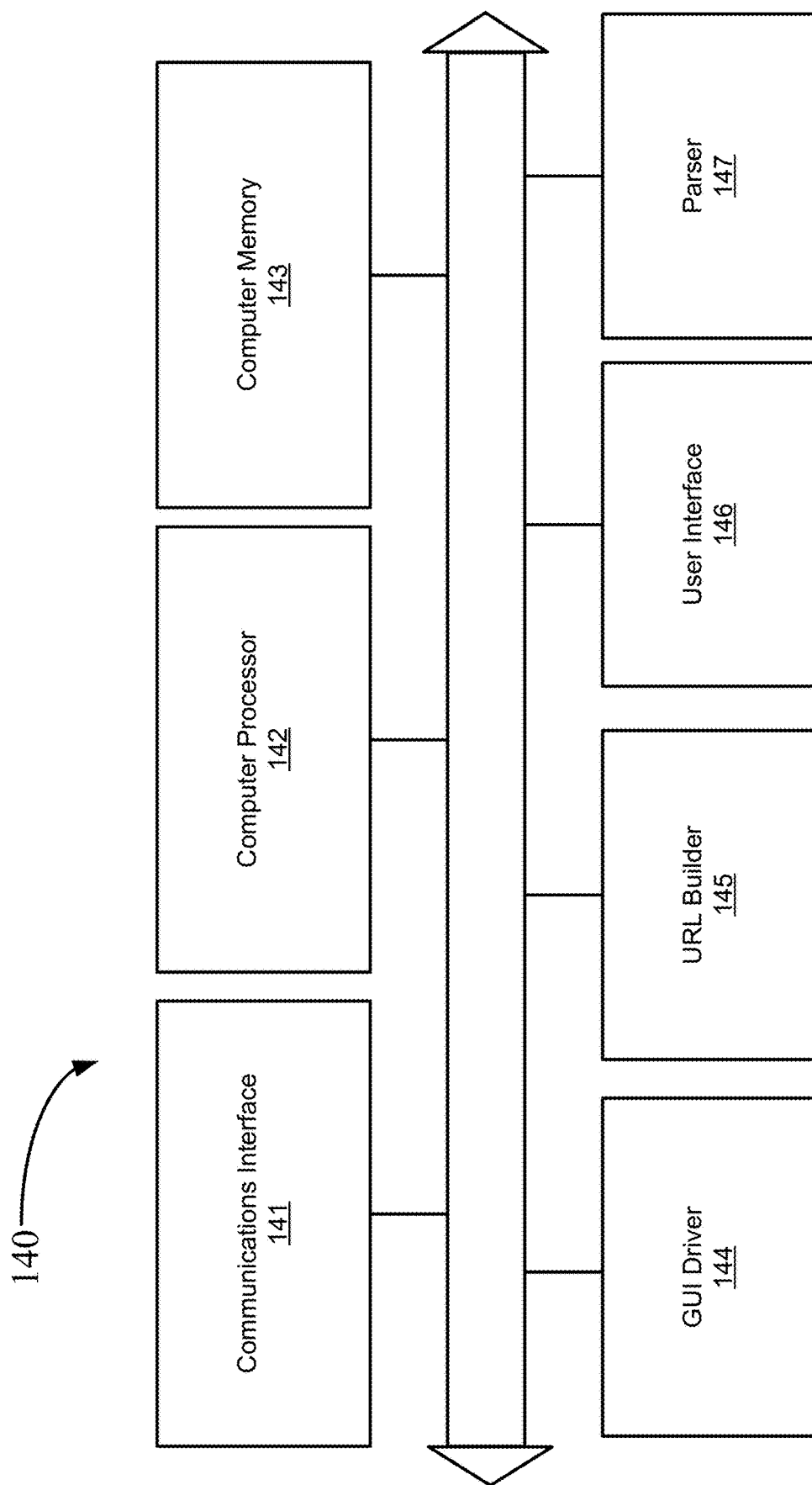
FIG. 1B schematically illustrates an embodiment of a system for generating an OData-compliant URL.

FIG. 1B schematically illustrates an embodiment of a URL developer system 140. In some embodiments, the components of the URL developer system are implemented on the client 110, as mentioned above.

The embodiment of the URL developer system 140 includes a communications interface 141 configured to communicate electronically with client 110 and/or other computers and the OData service 120 via the network 130.

The URL developer system 140 also includes a user interface module configured to present and operate a graphical user interface to allow a human user (e.g., a creator) to provide user input via the graphical user interface to create an OData-compliant URL. Embodiments of such a graphical user interface are described herein.

The URL developer system 140 also includes computer processor hardware 142, such as an i7 processor available from Intel Corporation, or a Ryzen 7 processor available from Advanced Micro Devices, Inc., to name but a few examples.

The URL developer system 140 also includes a computer memory 143 configured to store executable instructions, including instructions that, when executed by the computer processor 142 cause the computer processor 142 to execute methods described herein, including for example presenting a graphical user interface, storing user input received via the graphical user interface, and generating a protocol-compliant URL (e.g., OData-compliant URL) based at least in part on such user input. In illustrative embodiments, computer memory 143 may also (or in addition) be configured to store user input received from a user via a graphical user interface as described herein.

Some embodiments of the URL developer system 140 also include a metadata parser 147 configured to parse metadata from a metadata source (e.g., a metadata document).

Illustrative embodiments of the URL developer system 140 also include a GUI driver 144 configured to present a graphical user interface as described herein, and to request and receive user input via said graphical user interface. The GUI 144 driver by include a GUI data receiver configured to receive user input (e.g., one or more parameters) to specify details of a request to a data service.

Some embodiments of the URL developer system 140 also include a URL builder 145 configured to create (or construct or generate) an OData-compliant URL based at least in part on user input received via said graphical user interface.

Figure 2:
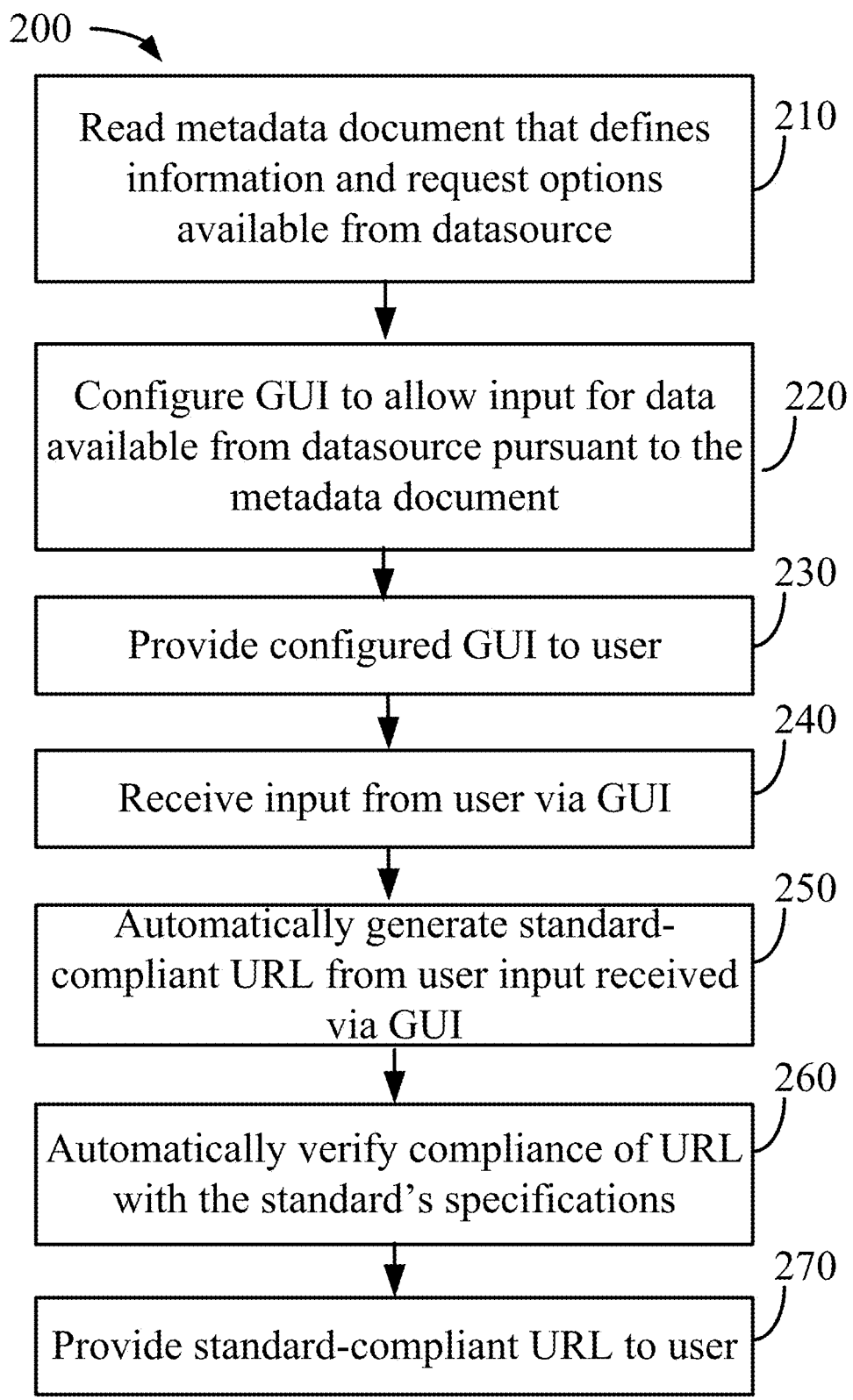
FIG. 2 is a flowchart illustrating steps according to an illustrative embodiment.

FIG. 2 is a flowchart illustrating steps according to an illustrative embodiment of a method 200. In some embodiments, the method 200 is executed by client 110, and in some embodiments the method 200 is executed by URL developer 140, and in some embodiments the method 200 is executed in part by client 110 and in part by URL developer 140.

Step 210 includes reading a metadata source (e.g., a metadata document) data that defines information and request options available from a data service 120 (which may be referred-do as a "source" of data). For embodiments in which the data service 120 is an OData service, the metadata source may be a $metadata document (i.e., a document requested by a client from, and sent to the client by, an OData service). In such embodiments, step 210 includes retrieving a metadata document from the OData service, for example via use of a $metadata call.

Step 210 also includes deriving, from the metadata document, information describing one or more of the types, sets, functions (e.g., data retrieval functions) and actions understood by the data service 120. Data retrieval functions may include, for example, an option that instructs the data service 120 to provide responsive data in a certain order; an option that instructs the data service 120 to limit responsive data to a user-specified number of records; an option that instructs the data service 120 to omit (or skip), from the responsive data, a specified number of records from its data store, to name but a few examples.

Deriving said information from the metadata document may include, in some embodiments, extracting said information by parsing the metadata document. The information describing the types, sets, functions and actions understood by the data service 120 may not include all types, sets, functions and actions available pursuant to the data service's specification (e.g., may not include all types, sets, functions and actions available pursuant to the OData specification, or the OpenAPI specification, to name but a few examples). Instead, the types, sets, functions and actions understood by the data service 120 may include only a subset of such types, sets, functions and actions. In other words, it is not necessary that all data services 120 (e.g., OData services) support or provide all types, sets, functions and actions available pursuant to the specification with which it complies.

Step 220 includes configuring (or "customizing") a graphical user interface pursuant to the metadata from the data service 120, such as information describing the types, sets, functions and actions understood by the data service 120. Some embodiments configure the graphical user interface to request (or solicit) user input only for the types, sets, functions and actions understood by the data service 120 corresponding to the metadata document, and/or to receive user input only for the types, sets, functions and actions understood by the data service 120 corresponding to the metadata document.

For example, if an OData service 120 does not provide or support a certain function defined by the OData specification, step 220 may configure the graphical user interface to refrain from offering to the user the option of selecting that function, and/or may configure the graphical user interface to refrain from accepting input from the user selecting or configuring that function. In other words, that function may be hidden (e.g., not even presented to the user via the graphical user interface) or disabled (e.g., the graphical user interface configured not to accept input selecting or configuring that function). Some embodiments configure or allow the graphical user interface to receive user input even for the types, sets, functions and actions not provided by or available from the OData service 120, but simply ignore such input, or alert the user that such input is not usable for that OData service 120.

Step 230 includes presenting the configured graphical user interface to the user. Here, the user may be a user 101 of the client 110, or a creator 102 using URL developer 140.

Step 240 includes receiving user input via the configured graphical user interface. In illustrative embodiments, step 240 also includes storing said user input, for example in a computer memory 143.

Step 250 then automatically generates a protocol-compliant URL tailored to the types, sets, functions and actions understood by the data service 120. Such a protocol-compliant URL may be referred-to as a "tailored URL" (or a "customized URL"), which tailored URL is based at least in part from user input received via the configured graphical user interface.

Automatically generating a protocol-compliant URL may include editing the user input (e.g., user input received via a graphical user input) into a format compliant with the protocol for which the protocol-compliant URL is to comply, and adding the edited user input to the protocol-compliant URL being generated (or to a previously-constructed portion of such a protocol-compliant URL). For example, in illustrative embodiments, editing such user input may include one or more of adding a prefix to the user input (for example, and without limitation a prefix such as "@" or "$"), and/or adding a suffix to the user input, and/or adding other protocol-specific elements to the user input, such a set of brackets (e.g., "{" and/or "}"; "{{" and/or "}}") or a set of parenthesis (e.g., "(" and/or ")"; "((" and/or "}}"), to name but a few examples. The exact editing, prefixed, suffixes, and/or other protocol-specific elements are defined by the protocol.

For example, when the data service 120 is an OData-compliant data service, step 250 automatically generates an OData-compliant URL based at least in part from user input received via the configured graphical user interface.

Some embodiments include step 260, which includes automatically verifying compliance of a generated URL with its corresponding specification (e.g., the OData specification; the OpenAPI specification, etc.). For example, some embodiments present a tailored URL to the user prior to finalizing the URL, and allow the user to edit the URL to create a user-edited URL. Step 260 may identify errors in the user-edited URL that cause the user-edited URL to fail to comply with one or more requirements or specifications. For example, a URL (including a user-edited URL) that fails to comply with one or more requirements of the OData specification is not an OData-compliant URL (and may be referred-to as a "non-compliant" URL). A URL (including a user-edited URL) that fails to comply with one or more requirements of the OpenAPI specification is not an OpenAPI-compliant URL (and may be referred-to as a "non-compliant" URL).

Some such embodiments identify a set of features of a non-compliant URL, for example by underlining, highlighting, or otherwise graphically accentuating such features, so that the user knows what the user needs to correct in order to produce a specification-compliant URL from the non-compliant URL. For example, when step 260 concludes that a URL is an OData compliant URL, the graphical user interface indicates that the URL is an OData-compliant URL, for example by displaying an icon or other graphical indicator, or a text indication, that the URL is an OData-compliant URL.

At step 270, the system 140 provides to the user, and/or to the client 110, the specification-compliant (e.g., OData-compliant; OpenAPI-compliant) URL.

In some embodiments, the graphical user interface includes several screens, each screen presenting a set of input devices to allow a user to provide user input. User input may include specification, by a user, of one or more parameters, which parameters define, for example, the form and/or content of responsive data to be provided by a data service.

Figure 3A:
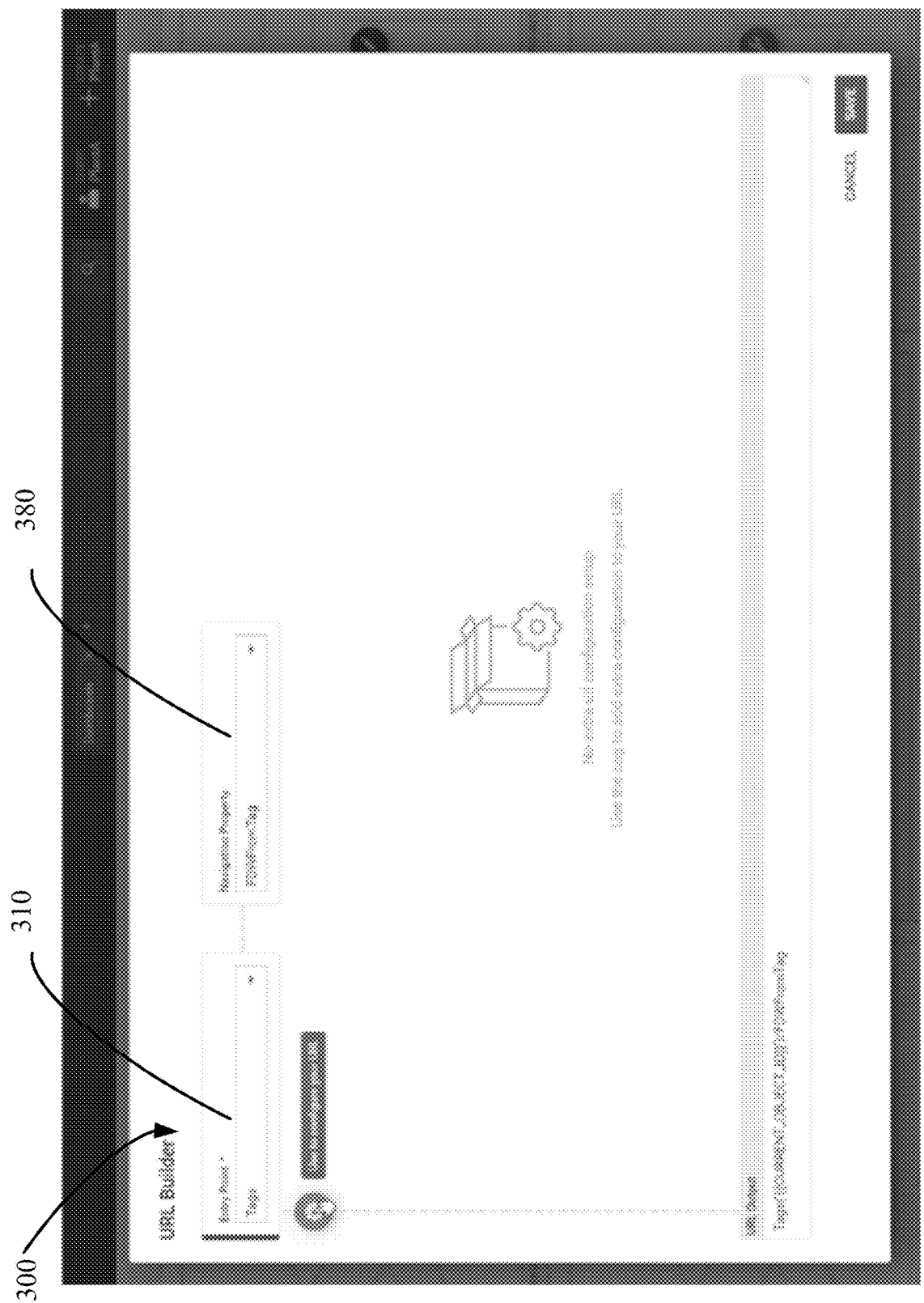
FIG. 3A schematically illustrates an embodiment of a screen of an embodiment of a graphical user interface.

FIG. 3A schematically illustrates an embodiment of a screen of an embodiment of a graphical user interface. In FIG. 3A, the GUI presents a graphical input device 310 (in this example, a drop down menu, but in other embodiments the input device may be an alpha-numeric entry box) captioned "Entry Point" and another graphical input device 380 (in this example, a drop down menu) captioned "Navigation Property."

The "Entry Point" graphical input device 310, which may also be referred to as an "Entity" graphical input device, solicits, and is configured to receive, from a GUI user selection or specification of a column (or "category" or "entity") of data sought by the user. The content of options available to be input by the user is customized in that it is produced from the metadata provided by the data service 120. In this example, data service 120 holds data grouped into columns. The columns of data available from a data source may be, for example, orders, client name, product ordered, or manufacturing plant, to name but a few examples.

Each column holds data that may be related to data in another column. For example, data in the "orders" column may be related to data in the "client name" column, in that each order in the "orders" column is associated with the name of the client that placed the order.

A drop-down menu under "Entry Point" lists all of those columns of data and makes them selectable by the user. In some embodiments, a text entry box may accept typed input from the user, which input specifies the column of data.

In the example of FIG. 3A, the user has specified (as a first user input parameter) "Tags" as the entry point column of source data.

The "Navigation Property" graphical input device 380 may be a drop-down menu or other input device (e.g., a text entry box) that allows, but in some embodiments does not require, the user to provide an additional parameter to refine the search.

In the example of FIG. 3A, because the user has specified "Tags" as the Entry Point, the user interface 300 has customized the "Navigation Property" input device 380 to provide a drop-down menu listing available tags, as specified by the data service 120 via its metadata document.

In the example of FIG. 3A, the user has used the Navigation Property input device to specify a tag (specifically, "FDWFromTag") that is made available by the data service 120.

Consequently, keeping with the example of FIG. 3A, the specified Entry Point parameter and the specified Navigation Property parameter specify that the protocol-compliant URL request, from the data service 120, source data from the "Tags" column of source data, which source data is limited to data tagged as "FDWFromTag." In this example, the method or system would consume that user input and produce the following OData-compliant URL:

Tags ("{{Current_Object_ID}}")/FDWFromTag

Note that the system has consumed the user input received via the user interface 300 and, by application of rules to that input, has created a protocol-compliant URL by formatting that input and adding it to the URL being built. Specifically, the system has added formatting marks including parenthesis, quotation marks, brackets and a slash, as specified by the OData specification.

Figure 3B:
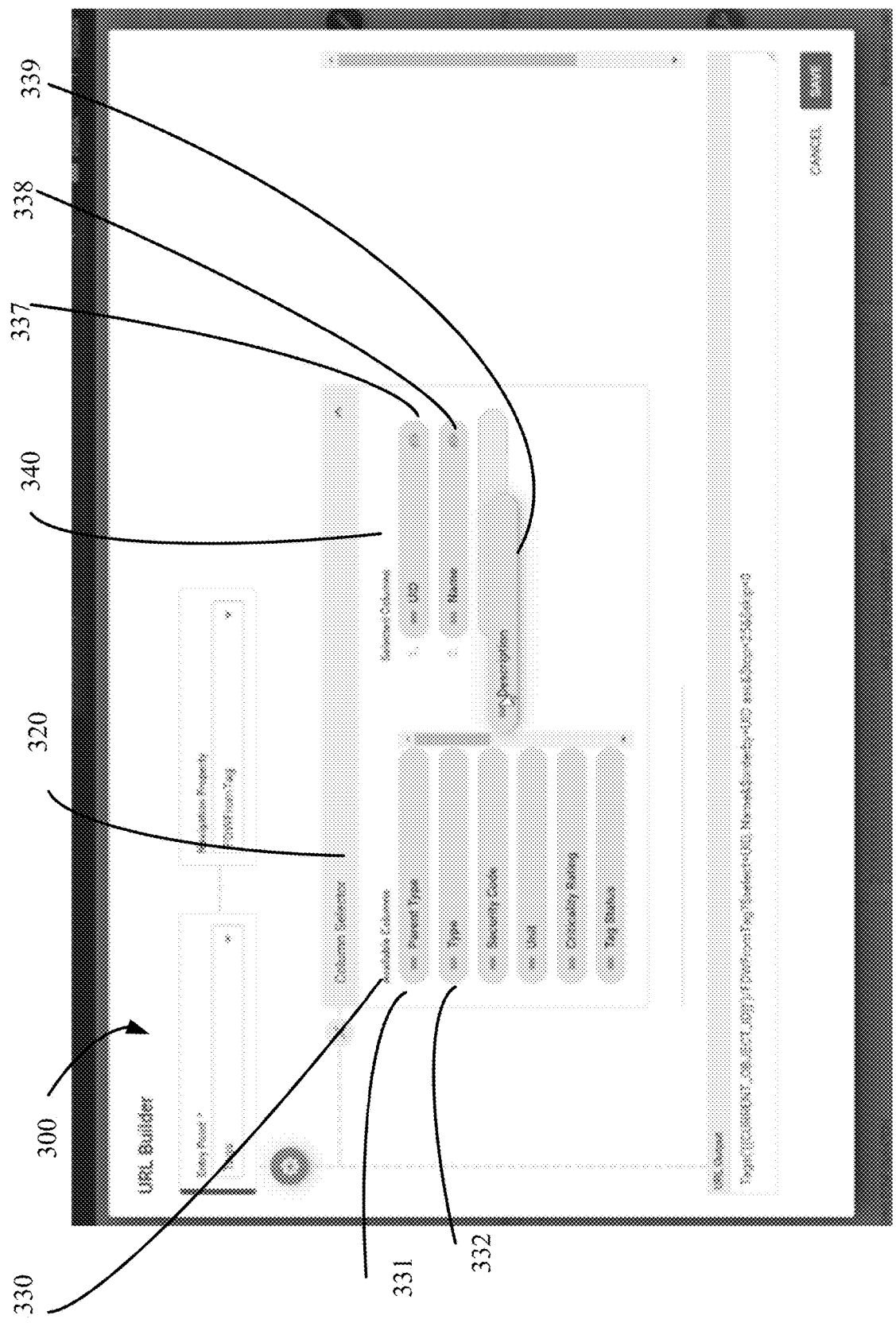
FIG. 3B schematically illustrates an embodiment of a screen of an embodiment of a graphical user interface.

Some embodiments provide a GUI that enables the user to specify that the responsive data includes only a subset of the source data. For example, FIG. 3B schematically illustrates an embodiment of a screen of an embodiment of a graphical user interface 300 by which the GUI 300 presents a "Column Selector" menu 320 having two windows. In in one window 330 captioned "Available Columns," a set of icons corresponding to data columns (or "entities") available from the data service 120 (i.e., as specified by the data service 120 in its metadata document). In the example of FIG. 3B, the "Available Columns" window 330 includes, for example, an icon 331 for "Parent Type," and an icon 332 for "Type," among others.

The user may specify a subset of source data to be included within the responsive data by dragging one or more of the column icons to a second window 340 captioned "Selected Columns." In this example, the user has dragged the "UID" icon 337 and the "Name" 338 icon to the second window 340 (and is in the process of dragging the "Description" icon 339 from the first window 330 to the second window 340). Referring now only to the example in which the user has dragged only the "UID" and "Name" icons to the second window, the method or system would consume that user input and produce the following OData-compliant URL:

Tags("{{Current_Object_ID}}")/
    FDWFromTag?select=UID, Name

Figure 3C:
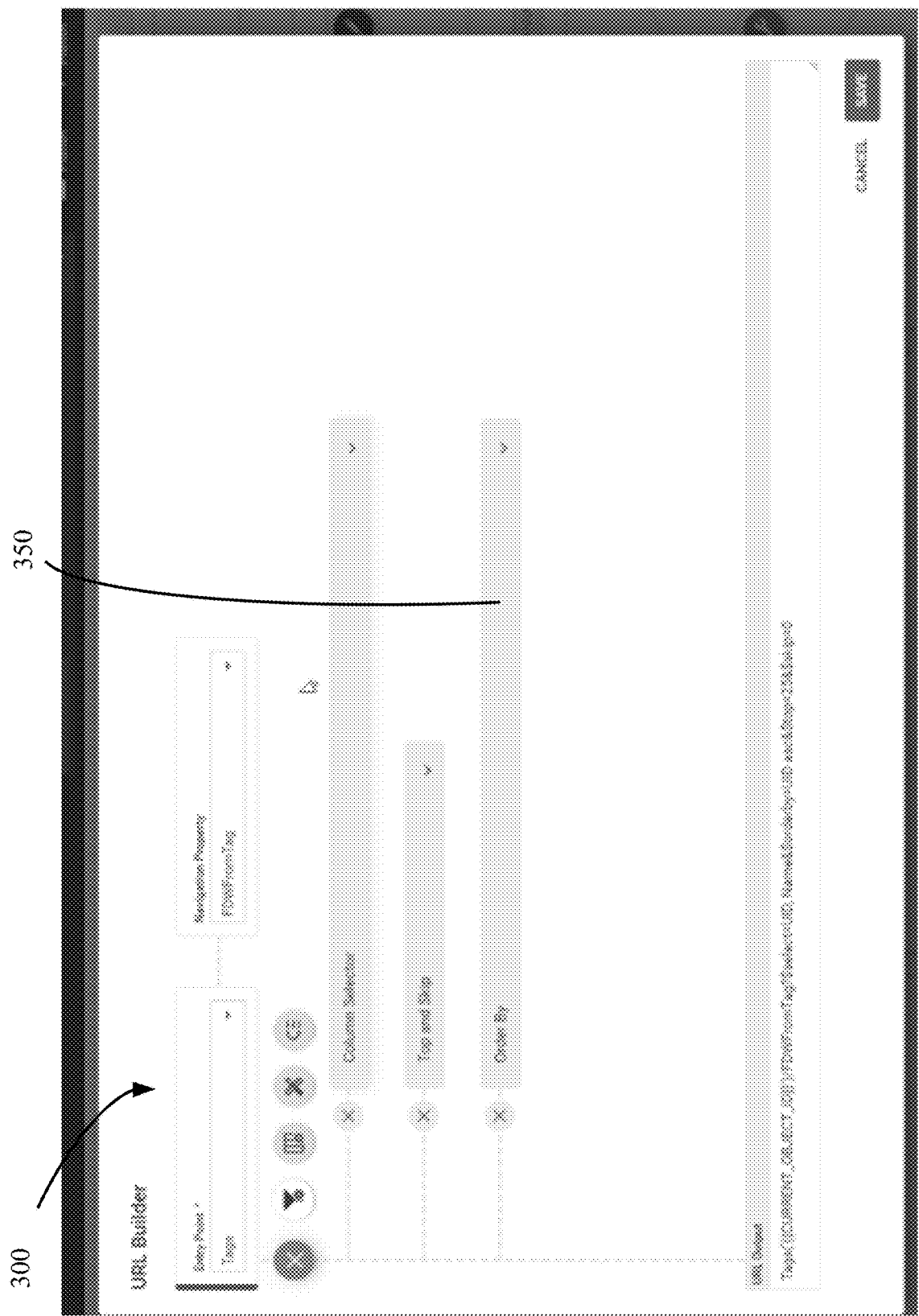
FIG. 3C schematically illustrates an embodiment of a screen of an embodiment of a graphical user interface.

Some embodiments enable a user to specify details of the form of responsive data. For example, FIG. 3C schematically illustrates an embodiment of a screen of an embodiment of a graphical user interface 300 that includes a graphical device 350 captioned "Order By." In illustrative embodiments, the "Order By" graphical device presents a listing of, for set of icons representing, the columns of data to be included in the responsive data. A user may specify (i.e., provide user input specifying) the arrangement of such columns within the responsive data by arranging the elements of the list, or arranging the icons, into the order in which the columns or source data within the responsive data are to be arranged. For an OData-compliant URL, such user input is formatted pursuant to the "$orderby" parameter.

Some embodiments enable a user to filter the data requested from and provided by the data service 120. Filtering may be specified by one or more filter input devices.

Figure 3D:
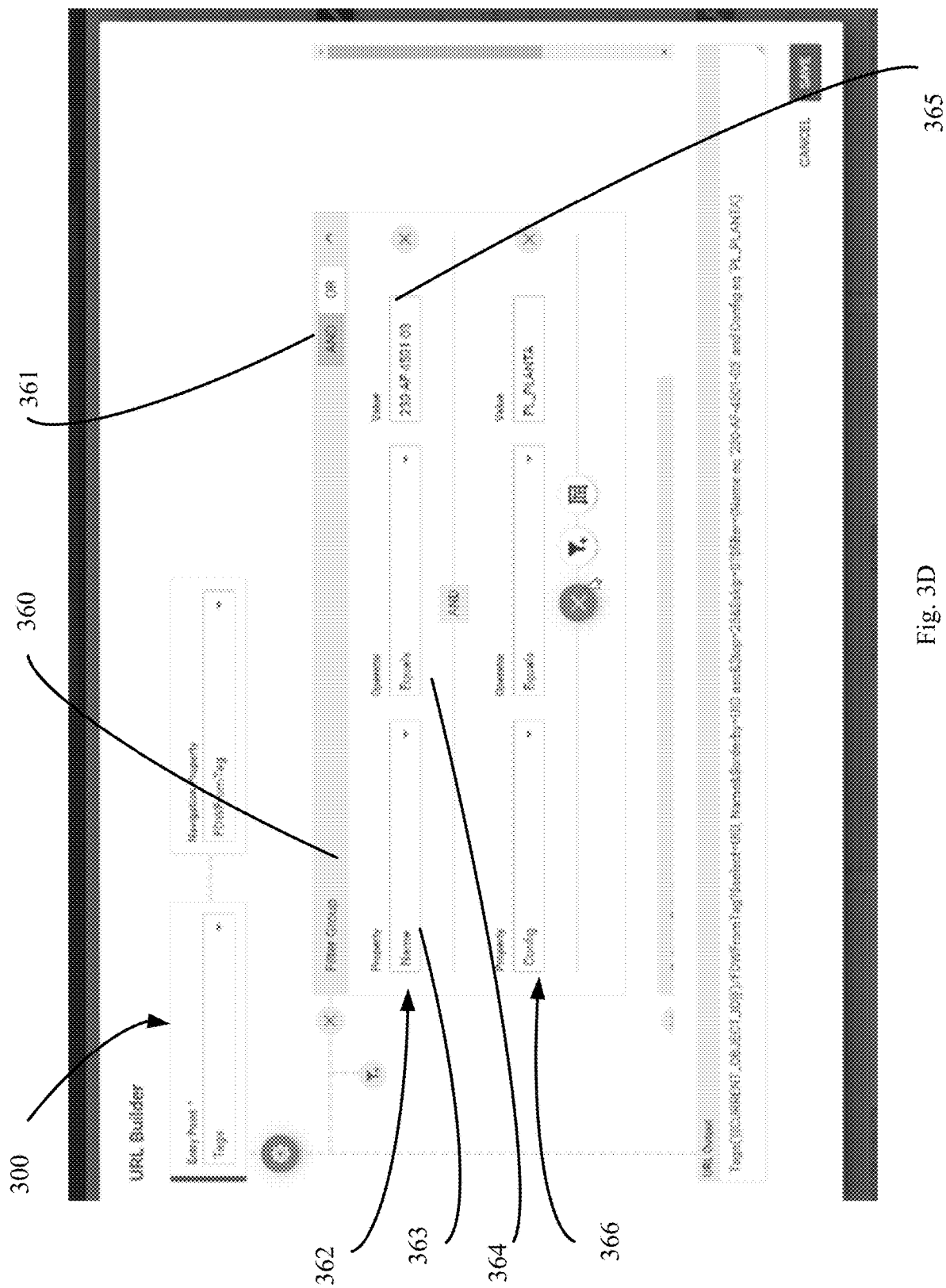
FIG. 3D schematically illustrates an embodiment of a screen of an embodiment of a graphical user interface.

For example, FIG. 3D schematically illustrates an embodiment of a screen of an embodiment of a graphical user interface 300 that includes a graphical device 360 captioned "Filter Group." The Filter Group device 360 is a drop-down menu that provides a second graphical device 362 having three graphical input devices: a "Property" drop-down menu 363, an "Operator" drop-down menu 364, and a "Value" input box 365.

The "Property" drop-down menu 363 is populated with properties as specified by the metadata document from the data service 120. A user may select, from the Property drop-down menu, a property associated with a data item (or data column) available from the data service 120. In alternative embodiments, the Property input device may be an alpha-numeric input device configured to receive typed input from the user to specify a property associated with a data item (or data column) available from the data service 120.

The "Value" input box 365 is configured to solicit and receive from the user specification of a datum on which the filter operates.

The "Operator" drop-down menu 364 solicits and receive from the user specification of an operator, such as "Equals" or "Not Equal," etc. In the example of FIG. 3D, the user has specified the property as "Name," the value as "230-AF-4501-03," and the operator as "Equals." Those inputs instruct the data service 120 to omit from response data items that have the name "230-AF-4501-03."

In the example of FIG. 3D, the Filter Group device 360 provides a third graphical device 366 having three graphical input devices: another "Property" drop-down menu 363, another "Operator" drop-down menu 364, and another "Value" input box 365.

In the example of FIG. 3D, the user has specified the property as "Config," the value as "PL_PLANTA," and the operator as "Equals." Those inputs instruct the data service 120 to omit from response data items that have the "Config" value "PL_PLANTA."

The example of FIG. 3D also includes a filter concatenator 361 that enables a user to specify whether a plurality of defined filters are to operate conjunctively ("AND") or disjunctively ("OR"). In the example of FIG. 3D, the user has selected "AND."

In keeping with preceding examples, the method or system would consume that user input and produce the following OData-compliant URL:

Tags("{{Current_Object_ID}}")/
    FDWFromTag?select=UID, Name&$orderby=UID ask &$top=25&$skip=0?$filter=(Name eq '230-AF-4501-03' and Config eq 'PL_PLANTA')

Note that, in constructing the foregoing OData-compliant URL, the method and system have consumed the user input by formatting that user input received via the user interface by adding elements specified by the OData specification (e.g., ampersands; Dollar signs, question marks, parenthesis, etc.) and added that formatted user input to the URL. Also, note that the foregoing OData-compliant URL also includes additional elements (e.g., "top" and "skip," which were specified by the user in user interface elements not shown in FIG. 3D).

Figure 3E:
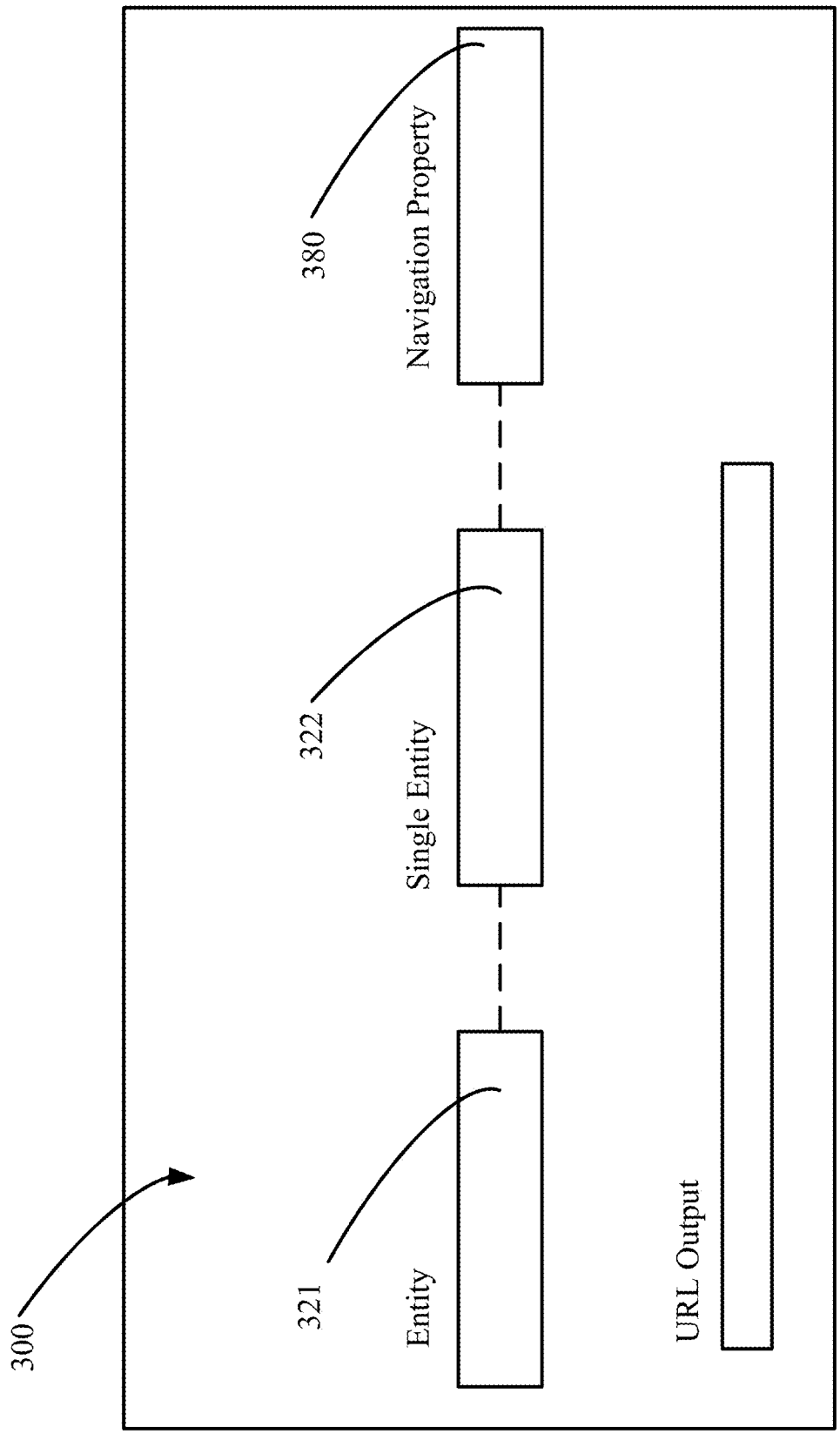
FIG. 3E schematically illustrates an embodiment of a screen of an embodiment of a graphical user interface.

FIG. 3E schematically illustrates an embodiment of a screen of an embodiment of a graphical user interface 300 to allow a user to specify a single object (or "single entity") of source data for inclusion in response data from the data service. In such an embodiment, the URL includes a starting entity which is the primary object type which describes the request. It is then possible to identify a single entity by supplying a unique identifier within the URL to restrict the response to only showing a single result.

Some embodiments allow a user to specify and retrieve a list of related items.

The embodiment of FIG. 3E includes a first graphical device 321 configured to receive from a user the user's specification of a column (or "category") of source data available from the data service, as specified by the metadata. In some embodiments, said first graphical device 321 may be referred-to as an "entity" graphical device. In some embodiments, the first graphical device 321 may be a drop-down menu for which the options in the drop-down menu are columns (or "categories") of source data available from the data service 120, as specified by the metadata. The first graphical device 321 is configured to receive, from a user, first user input specifying a category (or "entity") of the source data available from the data service, the category comprising a subset of said source data, the subset being less than all of the source data.

The embodiment of FIG. 3E also includes a second graphical input device 322 configured to receive, from the user, second user input specifying a single object of source data from the category specified by the user via the first graphical input device 321. In some embodiments, the second graphical input device 322 may be a drop-down menu for which the options of available single objects are objects available from the data service within the category, as specified by the metadata.

In operation of some illustrative embodiments, the GUI receives first user input via the first graphical input device, the first user input specifying the data column (which may be referred-to as the "selected" column), and second user input via the second graphical input device of the graphical user interface, the second user input specifying a single object within the selected column (which single object may be referred-to as the "primary" object or the "specified" object); and uses those inputs to generate a protocol-compliant uniform resource locator by application of a set of rules to the first user input and the second user input, wherein the protocol-compliant uniform resource locator is configured to request, from the data service, responsive data consisting of only the primary object.

Some illustrative embodiments produce a dummy URL that includes a placeholder for content which is subsequently added to the URL at runtime to produce the protocol-compliant URL. For example, at runtime the GUI may present to the user the "single entity" graphical input device 322 to solicit and receive from the user specification of the single entity. Upon receipt of the user's specification of the single entity via the "single entity" graphical input device 322, such illustrative methods and systems replace the placeholder in the dummy URL with the specified single entity, formatted according to the protocol pursuant to which the protocol-compliant URL is to be created, to produce the protocol-compliant URL.

Some embodiments may request, instead of only the primary object, a plurality of objects from the data service, including the primary object and other objects related to the primary object. To that end, some embodiments further include a "navigation property" graphical input device 380. If a user has chosen to pick a single object, a "navigation property" device 380 then becomes available to choose a relationship which can be expanded based on the primary entity. The navigation properties shown in the navigation property graphical input 380 are only valid for the primary entity and only appear once a single entity option has been chosen.

In illustrative embodiments, after each selection (entity, single entity, navigation property) the URL is automatically appended to and filtering, property selection and ordering by dynamically changed based on the new values driven from the metadata document.

Illustrative embodiments show, in the third graphical input 380, only navigation properties that are valid for (i.e., that identify other objects that are related to) the primary object. In some embodiments the third graphical input 380 is graphically presented in the graphical user interface 300 only after (and in response to) specification by the user of the primary object.

Illustrative embodiments consume the user's specification of the primary object and the navigation property to determine what other objects are related to the primary object. In such embodiments, specification, by a user, of a navigation property from the "navigation property" graphical input device 380 has the effect of expanding (or increasing) the scope or quantity of data from the data service to be included in responsive data, as opposed to narrowing the scope or quantity of data from the data service to be included in responsive data.

In operation, the GUI of such an embodiment receives first user input via the first graphical input device, the first user input specifying the data column (which may be referred-to as the "selected" column), and second user input via the second graphical input device of the graphical user interface, the second user input specifying a single object within the selected column (which single object may be referred-to as the "specified" object); and third user input specifying a set of navigation properties. Illustrative embodiments use those inputs to generate a protocol-compliant uniform resource locator by application of a set of rules to the first user input and the second user input and the third user input, wherein the protocol-compliant uniform resource locator is configured to request, from the data service, responsive data including not only the primary object, but also other objects from the specified category, which objects are related to the primary object.

Various embodiments may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A method of creating a uniform resource locator that complies with a RESTful API protocol (a "protocol-compliant" URL) at a computer remote from a data service, the method comprising:
 obtaining, from a metadata source, metadata describing source data available from the data service;
 customizing a graphical user interface ("GUI") by populating a set of graphical input devices within the GUI with information specified by the metadata, such that the GUI is configured to solicit and receive user input specifying a set of query options to request, from the data service, data available from the data service;
 receiving user input via the graphical user interface; and
 generating the protocol-compliant uniform resource locator by application of a set of rules to the user input.

P2. The method of P1, wherein the metadata source is the data service.

P3. The method of any of P1-P2, wherein a rule from the set of rules comprises formatting the user input into a format defined by the RESTful API protocol.

P4. The method of any of P1-P3, wherein a rule from the set of rules comprises adding, to the user input, a prefix defined by the RESTful API protocol.

P5. The method of any of P1-P4, wherein generating the protocol-compliant uniform resource locator by application of a set of rules to the user input comprises, for at least one item of user input:
appending a prefix to said user input and adding the prefix and user input to the protocol-compliant uniform resource locator.

P6. The method of any of P1-P5, wherein:
the metadata describes a plurality of categories of source data available from the available from the data service;
customizing a graphical user interface comprises providing a drop-down menu having a plurality of menu items, wherein each menu item of the plurality of menu items corresponds to a corresponding category from the plurality of categories of source data;
receiving user input via the graphical user interface comprises receiving user selection, via the drop-down menu, of a category from the plurality of categories of source data, which category is the selected category; and generating the protocol-compliant uniform resource locator by application of a set of rules to the user input comprises formatting the selected category into a format defined by the RESTful API protocol, which protocol-compliant uniform resource locator will cause the data service to provide the selected category as responsive data.

P7. The method of any of P1-P6, further comprising:
customizing a graphical user interface comprises providing a second graphical input device configured to receive a second parameter, which second parameter further limits the data of the selected category provided as responsive data; and wherein
receiving user input via the graphical user interface comprises receiving such a second parameter; and wherein
generating the protocol-compliant uniform resource locator by application of a set of rules to the user input comprises formatting said second parameter into a format defined by the RESTful API protocol such that protocol-compliant uniform resource locator is configured to cause the data service to provide responsive data comprising a subset of selected category as responsive data, said subset limited by the second parameter.

P8. The method of any of P1-P7, wherein:
customizing a graphical user interface comprises providing a third graphical input device configured to receive user input specifying a set of filters, wherein each filter further limits the data of the selected category provided as responsive data; and wherein
receiving user input via the graphical user interface comprises receiving user specification of each filter in the set of filters; and wherein
generating the protocol-compliant uniform resource locator by application of a set of rules to the user input comprises formatting said specification of each filter in the set of filters into a format defined by the RESTful API protocol, such that protocol-compliant uniform resource locator is configured to cause the data service to provide, as responsive data, a filtered subset of source data from the selected category.

P9. The method of any of P1-P8, wherein:
is at least one item of user input comprises an instruction to the data service to place, into a specified order, source data provided to the client by the data service in response to receipt, by the data service of the protocol-compliant uniform resource locator; and
generating the protocol-compliant uniform resource locator by application of a set of rules to the user input comprises formatting said specification of order into a format defined by the RESTful API protocol, such that protocol-compliant uniform resource locator is configured to cause the data service to provide responsive data arranged in the specified order.

P10. A system for creating a uniform resource locator that complies with a RESTful API protocol (a "protocol-compliant" URL) for enabling a client to request specified data held at a remote data service as source data, the system comprising:
a graphical user interface driver configured to create graphical user interface data ("GUI data") configured to present, to a user, a customized graphical user interface configured to solicit, from the user, user input;
a GUI data receiver configured to receive, via the graphical user interface, user input to specify source data to be retrieved from the data service; and
a protocol-compliant URL generator configured to apply a set of rules to the user input to produce, from said user input, a protocol-compliant URL.

P11. The system of P10, wherein:
the system is disposed at the data service; and
the data service further comprises a communications interface configured to send the protocol-compliant URL across a network work to the client.

P12. The system of any of P10-P11, wherein the system is disposed at the client.

P13. The system of any of P10-P12, wherein:
the system is disposed at the client; and
the system further comprises a communications interface configured to solicit and receive, from the data service, metadata identifying categories of source data available from the data service; and wherein
the graphical user interface driver is configured to customize the graphical user interface by populating the graphical user interface with said categories such that the user may specify, via the graphical user interface, a set of categories of data for retrieval from the data service; and wherein
the protocol-compliant URL generator is configured to format said set of categories of data into a format defined by the RESTful API protocol such that said protocol-compliant URL is configured to cause the data service to include, in responsive data, data from said categories of data.

P14. The system of any of P10-P13, wherein the protocol-compliant URL generator configured is to apply a set of rules to the user input by:
adding, to the user input, a prefix defined by the RESTful API protocol.

P15. The system of any of P10-P14, wherein the protocol-compliant URL generator configured is to apply a set of rules to the user input by:
appending a prefix to said user input; and
adding said user input with appended prefix to the protocol-compliant uniform resource locator.

P16. A computer program product comprising non-volatile executable code, the non-volatile executable code comprising:

code for reading, from a metadata source, metadata describing source data available from the data service;

code for customizing a graphical user interface ("GUI") by populating a set of graphical input devices within the GUI with information specified by the metadata document, such that the GUI is configured to solicit and receive user input specifying a set of query options to request, from the data service, data available from the data service;

code for receiving user input via the graphical user interface; and code for generating the protocol-compliant uniform resource locator by application of a set of rules to the user input.

P17. The computer program product of P16, wherein a rule from the set of rules comprises formatting the user input into a format defined by the RESTful API protocol.

P18. The computer program product of any of P16-P17, wherein a rule from the set of rules comprises adding, to the user input, a prefix defined by the RESTful API protocol.

P19. The computer program product of any of P16-P18, wherein the metadata describes a plurality of categories of source data available from the available from the data service, and:

code for customizing a graphical user interface comprises code for providing a drop-down menu having a plurality of menu items, wherein each menu item of the plurality of menu items corresponds to a corresponding category from the plurality of categories of source data;

code for receiving user input via the graphical user interface comprises code for receiving user selection, via the drop-down menu, of a category from the plurality of categories of source data, which category is the selected category; and code for generating the protocol-compliant uniform resource locator by application of a set of rules to the user input comprises code for formatting the selected category into a format defined by the RESTful API protocol, which protocol-compliant uniform resource locator will cause the data service to provide the selected category as responsive data.

P20. The computer program product of any of P16-P19, wherein at least one item of user input comprises an instruction to the data service to place, into a specified order, source data provided to the client by the data service in response to receipt, by the data service, of the protocol-compliant uniform resource locator; and wherein:

code for generating the protocol-compliant uniform resource locator by application of a set of rules to the user input comprises code for formatting said specification of order into a format defined by the RESTful API protocol, such that protocol-compliant uniform resource locator is configured to cause the data service to provide responsive data arranged in the specified order.

P201: A method of creating a uniform resource locator that complies with a RESTful API protocol (a "protocol-compliant" URL) at a computer remote from a data service, the method comprising:

obtaining, from a metadata source, metadata describing source data available from the data service;

customizing a graphical user interface ("GUI") by populating a set of graphical input devices within the GUI with information specified by the metadata, such that the GUI is configured to solicit and receive user input specifying a set of query options to request, from the data service, data available from the data service, wherein the set of graphical input devices within the GUI comprises:

a first graphical input device configured to receive, from a user, first user input specifying a category of the source data available from the data service, the category comprising a subset of said source data, the subset being less than all of the source data; and a second graphical input device configured to receive, from the user, second user input specifying a single object of source data from the category;

receiving first user input via the first graphical input device and second user input via the second graphical input device of the graphical user interface; and generating the protocol-compliant uniform resource locator by application of a set of rules to the first user input and the second user input, said protocol-compliant URL configured to solicit from the data service the single object of source data.

P202: The method of P201, wherein said protocol-compliant URL is configured to solicit from the data service only the single object of source data.

P203: The method of P201, wherein:

the set of graphical input devices within the GUI further comprises a third graphical input device configured to receive, from a user, specification of a navigation property, the navigation property defining a relationship between the single object and a set of other objects at the data source, such that the single object and each object in the set of other objects is related to one another; and wherein:

the protocol-compliant URL is configured to solicit from the data service the single object of source data along with a set of objects related to the single object of source data.

P204. The method of any of P201-P203, wherein the second graphical input device is configured to accept second user input comprising a user specification of a single object of source data from a limited and pre-specified set comprising a plurality of items of source data.

P205. The method of any of P201-P204, wherein each category of the source data available from the data service has an associated pre-specified set comprising a plurality of items of source data, and:

the second graphical input device comprises a drop-down menu configured to present to the user a listing of the pre-specified set of the plurality of items of source data, and wherein:

the pre-specified set of the plurality of items of source data is selected based on a prior specification, by the user, of first user input specifying a category of the source data available from the data service.

P206. The method of any of P201-P205, wherein the metadata source is the data service.

P207. The method of any of P201-P206, wherein application of a rule from the set of rules comprises applying a rule that formats the user input into a format defined by the RESTful API protocol.

P208. The method of any of P201-P207, wherein application of a rule from the set of rules comprises adding, to the user input, a prefix defined by the RESTful API protocol.

P209. The method of any of P201-P208, wherein generating the protocol-compliant uniform resource locator by application of a set of rules to the user input comprises, for at least one item of user input:
appending a prefix to said user input and adding the prefix and user input to the protocol-compliant uniform resource locator.

P210. A system for creating a uniform resource locator that complies with a RESTful API protocol (a "protocol-compliant" URL) for enabling a client to request specified data held at a remote data service as source data, the system comprising:
a graphical user interface driver configured to customize a graphical user interface ("GUI") by populating a set of graphical input devices within the GUI with information specified by the metadata, such that the GUI is configured to solicit and receive user input specifying a set of query options to request, from the data service, data available from the data service, wherein the set of graphical input devices within the GUI comprises:
a first graphical input device configured to receive, from a user, first user input specifying a category of the source data available from the data service, the category comprising a subset of said source data, the subset being less than all of the source data; and
a second graphical input device configured to receive, from the user, second user input specifying a single object of source data from the category;
a GUI data receiver configured to receive, via the graphical user interface, first user input via the first graphical input device and second user input via the second graphical input device of the graphical user interface; and
a protocol-compliant URL generator configured to apply a set of rules to the first user input and the second user input to produce, from said user input, the protocol-compliant URL, said protocol-compliant URL configured to solicit from the data service the single object of source data.

P211. The system of P210, wherein the second graphical input device is configured to accept second user input comprising a user specification of a single object of source data from a limited and pre-specified set comprising a plurality of items of source data.

P212. The system of any of P210-P211, wherein each category of the source data available from the data service has an associated pre-specified set comprising a plurality of items of source data, and:
the second graphical input device comprises a drop-down menu configured to present to the user a listing of the pre-specified set of the plurality of items of source data, and wherein the metadata source is the data service.
the pre-specified set of the plurality of items of source data is selected based on a prior specification, by the user, of first user input specifying a category of the source data available from the data service.

P213. The system of any of P210-P212, wherein the metadata source is the data service.

P214. The system of any of P210-P213, wherein application of a rule from the set of rules comprises applying a rule that formats the user input into a format defined by the RESTful API protocol.

P215. The system of any of P210-P214, wherein application of a rule from the set of rules comprises adding, to the user input, a prefix defined by the RESTful API protocol.

P216. The system of any of P210-P215, wherein generating the protocol-compliant uniform resource locator by application of a set of rules to the user input comprises, for at least one item of user input:
appending a prefix to said user input and adding the prefix and user input to the protocol-compliant uniform resource locator.

P217. The system of any of P210-P216, wherein said protocol-compliant URL is configured to solicit from the data service only the single object of source data.

P217. The system of any of P210-P216, wherein:
the set of graphical input devices within the GUI further comprises a third graphical input device configured to receive, from a user, specification of a navigation property, the navigation property defining a relationship between the single object and a set of other objects at the data source, such that the single object and each object in the set of other objects is related to one another; and wherein:
the protocol-compliant URL is configured to solicit from the data service the single object of source data along with a set of objects related to the single object of source data.

P221. A non-transitory computer-readable medium having computer code thereon, the computer code configured to be executed by a computer, the computer code comprising:
code for causing the computer to obtain, from a metadata source, metadata describing source data available from the data service;
code for causing the computer to present a graphical user interface ("GUI") by populating a set of graphical input devices within the GUI with information specified by the metadata, such that the GUI is configured to solicit and receive user input specifying a set of query options to request, from the data service, data available from the data service, wherein the set of graphical input devices within the GUI comprises:
a first graphical input device configured to receive, from a user, first user input specifying a category of the source data available from the data service, the category comprising a subset of said source data, the subset being less than all of the source data; and
a second graphical input device configured to receive, from the user, second user input specifying a single object of source data from the category;
code for causing the computer to receive first user input via the first graphical input device and second user input via the second graphical input device of the graphical user interface; and
code for causing the computer to generate the protocol-compliant uniform resource locator by application of a set of rules to the first user input and the second user input, said protocol-compliant URL configured to solicit from the data service the single object of source data.

P222. The non-transitory computer-readable medium of P221, wherein the second graphical input device is configured to accept second user input comprising a user specification of a single object of source data from a limited and pre-specified set comprising a plurality of items of source data.

P223. The non-transitory computer-readable medium of any of P221-P222, wherein each category of the source data available from the data service has an associated pre-specified set comprising a plurality of items of source data, and:
the second graphical input device comprises a drop-down menu configured to present to the user a listing of the pre-specified set of the plurality of items of source data, and wherein:
the pre-specified set of the plurality of items of source data is selected based on a prior specification, by the user, of first user input specifying a category of the source data available from the data service.

P224. The non-transitory computer-readable medium of any of P221-P223, wherein the metadata source is the data service.

P225. The non-transitory computer-readable medium of any of P221-P224, wherein application of a rule from the set of rules comprises applying a rule that formats the user input into a format defined by the RESTful API protocol.

P226. The non-transitory computer-readable medium of any of P221-P225, wherein application of a rule from the set of rules comprises at least one of:
adding, to the user input, a prefix defined by the RESTful API protocol; and
appending a prefix to said user input and adding the prefix and user input to the protocol-compliant uniform resource locator.

P227: The non-transitory computer-readable medium of any of P221-P226, wherein said protocol-compliant URL is configured to solicit from the data service only the single object of source data.

P228: The non-transitory computer-readable medium of any of P221-P226, wherein:
the set of graphical input devices within the GUI further comprises a third graphical input device configured to receive, from a user, specification of a navigation property, the navigation property defining a relationship between the single object and a set of other objects at the data source, such that the single object and each object in the set of other objects is related to one another; and wherein:
the protocol-compliant URL is configured to solicit from the data service the single object of source data along with a set of objects related to the single object of source data.

A listing of certain reference numbers is presented below.

100: System employing tailored URL (e.g., OData-compliant URL; OpenAPI-compliant URL);
110: Client system;
120: Data service or datasource (e.g., OData service; OpenAPI service);
130: Communication network;
140: URL developer;
141: Communications interface;
142: Computer processor;
143: Computer memory;
144: GUI driver;
145: URL builder;
146: User interface;
147: Parser;
300: Graphical User Interface ("GUI");
310: Graphical input device;
320: "Column Selector" graphical input device;
321: "Entity" graphical input device;
322: "Single Entity" graphical input device;
330: "Available Columns" graphical input device;
331: "Parent Type" icon;
332: "Type" icon;
337: "UID" icon;
338: "Name" icon;
339: "Description" icon;
340: "Selected Columns" widow;
350: "Order By" graphical input device;
360: "Filter Group" device
361: Filter concatenator selector;
362: Second graphical device;
363: "Property" drop-down menu;
364: "Operator" drop-down menu;
365: "Value" input box;
366: Third graphical device;
380: "Navigation Property" input device.

Various embodiments of this disclosure may be implemented at least in part in any conventional computer programming language. For example, some embodiments may be implemented in a procedural programming language (e.g., "C"), or in an object-oriented programming language (e.g., "C++"), or in Python, R, Java, LISP, or Prolog. Other embodiments of this disclosure may be implemented as preprogrammed hardware elements (e.g., application specific integrated circuits, FPGAs, and digital signal processors), or other related components.

In an alternative embodiment, the disclosed apparatus and methods may be implemented as a computer program product for use with a computer system. Such implementation may include a series of computer instructions fixed either on a tangible medium, such as a non-transient computer readable medium (e.g., a diskette, CD-ROM, ROM, FLASH memory, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of this disclosure may be implemented as a combination of both software (e.g., a computer program product) and hardware. Still other embodiments of this disclosure are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The embodiments described above are intended to be merely exemplary; numerous variations and modifications will be apparent to those skilled in the art. All such variations and modifications are intended to be within the scope of the present disclosure as defined in any appended claims.

What is claimed is:

1. A method of creating a uniform resource locator that complies with a RESTful API protocol (a "protocol-compliant" URL) at a computer remote from a data service, the method comprising:
   obtaining, from a metadata source, metadata describing source data available from the data service;
   customizing a graphical user interface ("GUI") by populating a set of graphical input devices within the GUI with information specified by the metadata, such that the GUI is configured to solicit and receive user input specifying a set of query options to request, from the data service, data available from the data service, wherein the set of graphical input devices within the GUI comprises:
      a first graphical input device configured to receive, from a user, first user input specifying a category of the source data available from the data service, the category comprising a subset of said source data, the subset being less than all of the source data; and
      a second graphical input device configured to receive, from the user, second user input specifying a single object of source data from the category;
   receiving first user input via the first graphical input device and second user input via the second graphical input device of the graphical user interface; and
   generating the protocol-compliant uniform resource locator by application of a set of rules to the first user input and the second user input, said protocol-compliant URL configured to solicit from the data service the single object of source data.

2. The method of claim 1, wherein the second graphical input device is configured to accept second user input comprising a user specification of a single object of source data from a limited and pre-specified set comprising a plurality of items of source data.

3. The method of claim 1, wherein each category of the source data available from the data service has an associated pre-specified set comprising a plurality of items of source data, and:
   the second graphical input device comprises a drop-down menu configured to present to the user a listing of the pre-specified set of the plurality of items of source data, and wherein:
   the pre-specified set of the plurality of items of source data is selected based on a prior specification, by the user, of first user input specifying a category of the source data available from the data service.

4. The method of claim 1, wherein the metadata source is the data service.

5. The method of claim 1, wherein application of a rule from the set of rules comprises applying a rule that formats the user input into a format defined by the RESTful API protocol.

6. The method of claim 1, wherein application of a rule from the set of rules comprises adding, to the user input, a prefix defined by the RESTful API protocol.

7. The method of claim 1, wherein generating the protocol-compliant uniform resource locator by application of a set of rules to the user input comprises, for at least one item of user input:
   appending a prefix to said user input and adding the prefix and user input to the protocol-compliant uniform resource locator.

8. A system for creating a uniform resource locator that complies with a RESTful API protocol (a "protocol-compliant" URL) for enabling a client to request specified data held at a remote data service as source data, the system comprising:
   a graphical user interface driver configured to customize a graphical user interface ("GUI") by populating a set of graphical input devices within the GUI with information specified by the metadata, such that the GUI is configured to solicit and receive user input specifying a set of query options to request, from the data service, data available from the data service, wherein the set of graphical input devices within the GUI comprises:
      a first graphical input device configured to receive, from a user, first user input specifying a category of the source data available from the data service, the category comprising a subset of said source data, the subset being less than all of the source data; and
      a second graphical input device configured to receive, from the user, second user input specifying a single object of source data from the category;
   a GUI data receiver configured to receive, via the graphical user interface, first user input via the first graphical input device and second user input via the second graphical input device of the graphical user interface; and
   a protocol-compliant URL generator configured to apply a set of rules to the first user input and the second user input to produce, from said user input, the protocol-compliant URL, said protocol-compliant URL configured to solicit from the data service the single object of source data.

9. The system of claim 8, wherein the second graphical input device is configured to accept second user input comprising a user specification of a single object of source data from a limited and pre-specified set comprising a plurality of items of source data.

10. The system of claim 8, wherein each category of the source data available from the data service has an associated pre-specified set comprising a plurality of items of source data, and:
    the second graphical input device comprises a drop-down menu configured to present to the user a listing of the pre-specified set of the plurality of items of source data, and wherein the metadata source is the data service;
    the pre-specified set of the plurality of items of source data is selected based on a prior specification, by the user, of first user input specifying a category of the source data available from the data service.

11. The system of claim 8, wherein the metadata source is the data service.

12. The system of claim 8, wherein application of a rule from the set of rules comprises applying a rule that formats the user input into a format defined by the RESTful API protocol.

13. The system of claim 8, wherein application of a rule from the set of rules comprises adding, to the user input, a prefix defined by the RESTful API protocol.

14. The system of claim 8, wherein generating the protocol-compliant uniform resource locator by application of a set of rules to the user input comprises, for at least one item of user input:
appending a prefix to said user input and adding the prefix and user input to the protocol-compliant uniform resource locator.

15. A non-transitory computer-readable medium having computer code thereon, the computer code configured to be executed by a computer, the computer code comprising:
code for causing the computer to obtain, from a metadata source, metadata describing source data available from the data service;
code for causing the computer to present a graphical user interface ("GUI") by populating a set of graphical input devices within the GUI with information specified by the metadata, such that the GUI is configured to solicit and receive user input specifying a set of query options to request, from the data service, data available from the data service, wherein the set of graphical input devices within the GUI comprises:
a first graphical input device configured to receive, from a user, first user input specifying a category of the source data available from the data service, the category comprising a subset of said source data, the subset being less than all of the source data; and
a second graphical input device configured to receive, from the user, second user input specifying a single object of source data from the category;
code for causing the computer to receive first user input via the first graphical input device and second user input via the second graphical input device of the graphical user interface; and
code for causing the computer to generate the protocol-compliant uniform resource locator by application of a set of rules to the first user input and the second user input, said protocol-compliant URL configured to solicit from the data service the single object of source data.

16. The non-transitory computer-readable medium of claim 15, wherein the second graphical input device is configured to accept second user input comprising a user specification of a single object of source data from a limited and pre-specified set comprising a plurality of items of source data.

17. The non-transitory computer-readable medium of claim 15, wherein each category of the source data available from the data service has an associated pre-specified set comprising a plurality of items of source data, and:
the second graphical input device comprises a drop-down menu configured to present to the user a listing of the pre-specified set of the plurality of items of source data, and wherein:
the pre-specified set of the plurality of items of source data is selected based on a prior specification, by the user, of first user input specifying a category of the source data available from the data service.

18. The non-transitory computer-readable medium of claim 15, wherein the metadata source is the data service.

19. The non-transitory computer-readable medium of claim 15, wherein application of a rule from the set of rules comprises applying a rule that formats the user input into a format defined by the RESTful API protocol.

20. The non-transitory computer-readable medium of claim 15, wherein application of a rule from the set of rules comprises at least one of:
adding, to the user input, a prefix defined by the RESTful API protocol; and
appending a prefix to said user input and adding the prefix and user input to the protocol-compliant uniform resource locator.

\* \* \* \* \*